United States Patent [19]
Katoh et al.

[11] Patent Number: 5,693,930
[45] Date of Patent: Dec. 2, 1997

[54] OPTICAL SCANNER HAVING A PLURALITY OF SCANNING SYSTEMS

[75] Inventors: Hiroaki Katoh; Hiroshi Watanuki; Toshiyuki Ichikawa, all of Kawasaki, Japan

[73] Assignee: Fujitsu Limited, Kawasaki, Japan

[21] Appl. No.: 688,680

[22] Filed: Jul. 29, 1996

Related U.S. Application Data

[63] Continuation of Ser. No. 395,527, Feb. 27, 1995, abandoned, which is a continuation of Ser. No. 88,648, Jul. 9, 1993, abandoned.

[30] Foreign Application Priority Data

Jul. 10, 1992 [JP] Japan .................................. 4-184218

[51] Int. Cl.⁶ .................................................. G06K 7/10
[52] U.S. Cl. .......................... 235/467; 235/462; 235/470
[58] Field of Search .................................... 235/462, 467, 235/470, 472, 463, 440

[56] References Cited

U.S. PATENT DOCUMENTS

| | | | |
|---|---|---|---|
| 4,652,732 | 3/1987 | Nickl | 235/462 |
| 5,073,702 | 12/1991 | Schuhmacher | 235/470 |
| 5,175,421 | 12/1992 | Harris | 235/462 |
| 5,206,491 | 4/1993 | Katoh et al. | 235/467 |
| 5,223,700 | 6/1993 | Takenaka | 235/467 |
| 5,229,588 | 7/1993 | Detwiler | 235/467 |
| 5,268,565 | 12/1993 | Katoh et al. | 235/467 |
| 5,293,033 | 3/1994 | Yamashita | 235/462 |
| 5,314,631 | 5/1994 | Katoh et al. | 235/472 |

FOREIGN PATENT DOCUMENTS

| | | |
|---|---|---|
| 4-223582 | 8/1992 | Japan . |
| 4-287183 | 10/1992 | Japan . |

*Primary Examiner*—Donald T. Hajec
*Assistant Examiner*—Karl Frech
*Attorney, Agent, or Firm*—Staas & Halsey

[57] ABSTRACT

An optical scanner for optically scanning a bar code includes a housing having a window formed on a selected surface thereof, a first scanning system, housed in the housing, for emitting a first scanning beam from the housing through the window and a second scanning system, housed in the housing, for emitting a second scanning beam from the housing through the window. The first scanning beam moves in a first scanning pattern and the second scanning beam moves in a second scanning pattern which is different from the first scanning pattern. Additionally, the second scanning pattern may be used for scanning a bar code having a selected special form.

40 Claims, 13 Drawing Sheets

OPTICAL SCANNER HAVING A PLURALITY OF SCANNING SYSTEMS

This application is a continuation of parent application Ser. No. 08/395,527, filed Feb. 27, 1995, now abandoned, which, in turn, is a continuation of grandparent application Ser. No. 08/088,648, filed Jul. 9, 1993, now abandoned.

BACKGROUND OF THE INVENTION

(1) Field of the invention

The present invention generally relates to an optical scanner, and more particularly to an optical scanner applicable to a bar code reader.

(2) Description of the related art

To increase the efficiency of merchandise management and checking, POS (Point of Sales) systems have been introduced in department stores and supermarkets. The POS system is provided with a bar code reader for optically reading bar codes attached onto commodities so that information regarding the commodities is efficiently input to the POS system.

Recently, various commodities have had bar codes attached thereto, and bar codes having various forms have been used in accordance with the shapes of the commodities. Thus, it is required that the bar code reader be able to read bar codes having various forms.

In addition, use of the bar code readers has become popular in small-scale supermarkets, small-scale department stores and specialty stores in all of which service counters provided with bar code readers are small. Thus, it is required that the bar code readers used therein be miniaturized.

Figure 1:
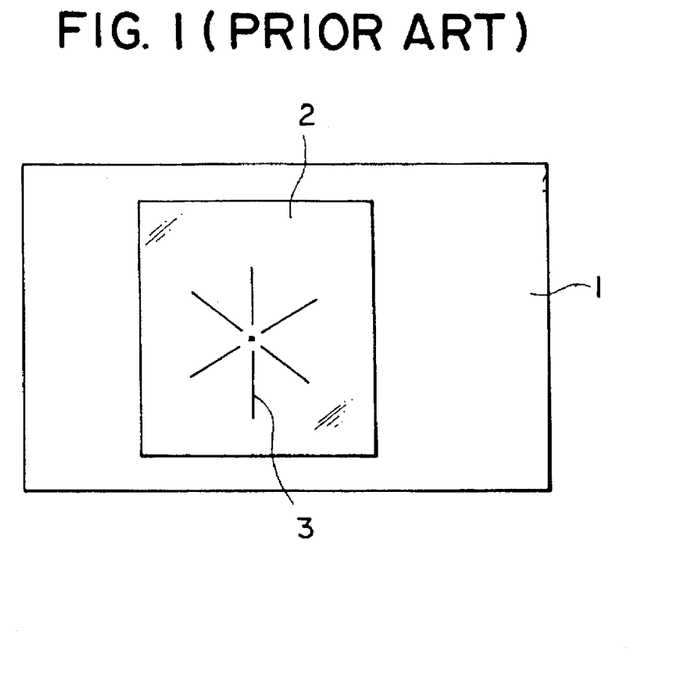
FIG. 1 is a plan view illustrating a conventional bar code reader.
Figure 2:
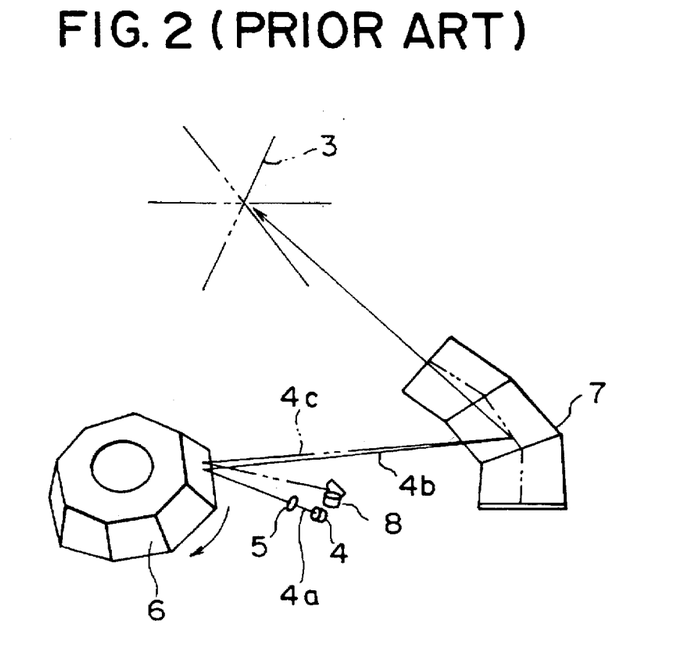
FIG. 2 is a diagram illustrating a scanning unit provided in a conventional bar code reader.

FIG. 1 and FIG. 2 show a stationary type of conventional bar code reader. Referring to FIG. 1, a window 2 is formed on a top surface of a housing 1 of a bar code reader. A laser beam is emitted through the window 2 to form a scanning pattern 3 formed of scanning lines extending in various directions. When a commodity is brought into a space over the window 2, a surface of the commodity is scanned by the laser beam having the scanning pattern 3. A reflected beam from the surface of the commodity returns into the housing 1 of the bar code reader through the window 2.

A scanning unit as shown in FIG. 2 is mounted in the housing 1. Referring to FIG. 2, the scanning unit has a laser diode 4, a beam forming lens 5, a polygonal mirror 6, and a reflecting mirror 7 having three surfaces. A laser beam 4a emitted from the laser diode 4 travels to the polygonal mirror 6 via the beam forming lens 5 and is reflected by surfaces of the polygonal mirror 6. A reflected laser beam 4b from the polygonal mirror 6 travels to the three surfaces of the reflecting mirror 7 and scans them. The laser beam 4b reflected by the three surfaces of the reflecting mirror 7 is emitted from the housing 1 through the window 2, and three scanning lines extending in directions corresponding to the three surfaces of the reflecting mirror 7 are formed in a space over the window 2. That is, the scanning pattern 3 is formed in the space over the window 2. A laser beam reflected by a surface of a commodity onto which a bar code is attached returns into the housing 1 through the window 2. The laser beam 4c entering the housing 1 travels to a photodetector 8 via the reflecting mirror 7 and the polygonal mirror 6. The photodetector 8 outputs signals corresponding to the pattern of the bar code attached onto the surface of the commodity.

In the above stationary type of bar code reader, it is desired that the commodity be positionable within a wide range of positions, and that the bar code on the commodity be precisely readable in any of these positions. Thus, the scanning pattern 3 is formed of many scanning lines extending in various directions. According to this structure of the scanning pattern, no matter where the commodity is positioned in the space over the window 2, at least one of the scanning lines can certainly cross all bars of the bar code attached onto the surface of the commodity. However, to increase the number of scanning lines, the laser beam reflected by the polygonal mirror 6 must be divided into many beams corresponding to the scanning lines by the reflecting mirror 7 having many surfaces. As a result, each of the scanning lines is shortened. If the bar code reader is miniaturized, a range within which the laser beam can be swung by the polygonal mirror 6 becomes narrow. In this case, each of the scanning line is further shortened. When each of the scanning lines is shortened, it is difficult to read a bar code having a long sideways form in which the respective distances between the bars are large.

Figure 3A:
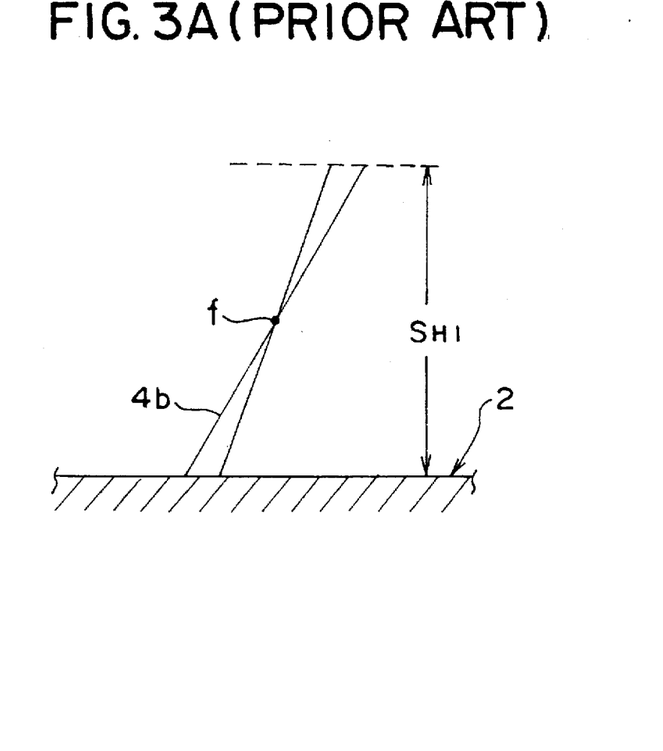
FIG. 3A and 3B are diagrams illustrating examples of readable depths set over a window of the bar code reader.
Figure 3B:
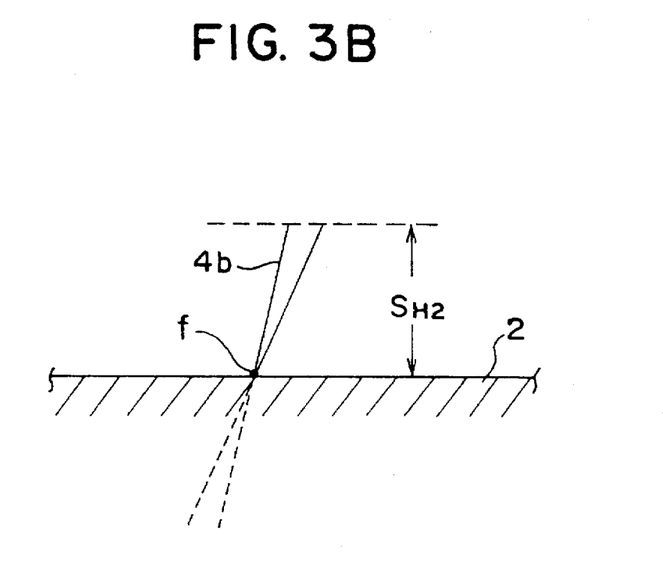

In addition, in the stationary type of bar code reader, it is also desired that the space in which the bar code can be precisely read be large. Thus, as shown in FIG. 3A, a focal point (f) of the laser beam 4b emitted through the window 2 is positioned over the window 2. To precisely read the bar code, the spot of the laser beam must be smaller than the respective distances between the bars of the bar code. That is, the focal point (f) is positioned over the window 2 such that the spot of the laser beam 4b on the surface of the window 2 is smaller than the respective distances between the bars of the bar code having a normal form. As a result, a space having a readable depth $S_{H1}$ as shown in FIG. 3A is set, as the space in which the bar code can be read, over the window 2. If the focal point (f) of the laser beam 4b is positioned on the surface of the window 2 as shown in FIG. 3B, a readable depth $S_{H2}$ is less than the readable depth $S_{H1}$ shown in FIG. 3A. Thus, as described above, the focal point (f) of the laser beam 4b is positioned over the window 2.

In a case where a bar code in which respective distances between bars are small is to be read by the laser beam, the bar code must be scanned by the beam spot close to the focal point (f) of the laser beam. However, in this case, as the focal point (f) of the laser beam is positioned so as to be separated from the surface of the window 2 as shown in FIG. 3A, it is difficult to bring the bar code to a position at which the beam spot close to the focal position (f) of the laser beam can scan the bar code. In addition, when missreading of the bar code occurs, the operator tends to bring the bar code close to the surface of the window 2. However, the closer the bar code is brought to the surface of the window 2, the larger the spot of the laser beam becomes, as shown in FIG. 3A. Thus, when the bar code is brought close to the surface of the window 2, missreading of the bar code occurs frequently.

SUMMARY OF THE INVENTION

Accordingly, a general object of the present invention is to be provide a novel and useful optical scanner in which the disadvantages of the aforementioned prior art are eliminated.

A more specific object of the present invention is to provide an optical scanner in which both a bar code having a normal form and a bar code having a special form can be precisely scanned.

The above objects of the present invention are achieved by an optical scanner for optically scanning a bar code, the optical scanner comprising: a housing having a window formed on a predetermined surface thereof; a first scanning system, housed in the housing, for emitting a first scanning beam from the housing through the window, the first scanning beam moving in a first scanning pattern; and a second scanning system, housed in the housing, for emitting a second scanning beam from the housing through the window, the second scanning beam moving in a second scanning pattern different from the first scanning pattern, the second scanning pattern being suitable for scanning a bar code having a predetermined special form.

According to the present invention as described above, a bar code having a normal form can be precisely scanned by the first scanning beam moving in the first scanning pattern, and a bar code having a special form can be precisely scanned by the second scanning beam moving in the second scanning pattern.

Since a bar code having a long sideways form can be precisely scanned by the second scanning beam, it is preferable that a scanning line included in the second scanning pattern be longer than a scanning line included in the first scanning pattern.

Further, since a bar code has a form in which respective distances between bars can be precisely scanned by the second scanning beam, it is preferable that a focal point of the second scanning beam be positioned on or close to a surface of said window.

Additional objects, features and advantages of the present invention will become apparent from the following detailed description when read in conjunction with the accompanying drawings.

DESCRIPTION OF THE PREFERRED EMBODIMENTS

A description will now be given, with reference to FIG. 4, of the principle of an embodiment of the present invention.

Figure 4:
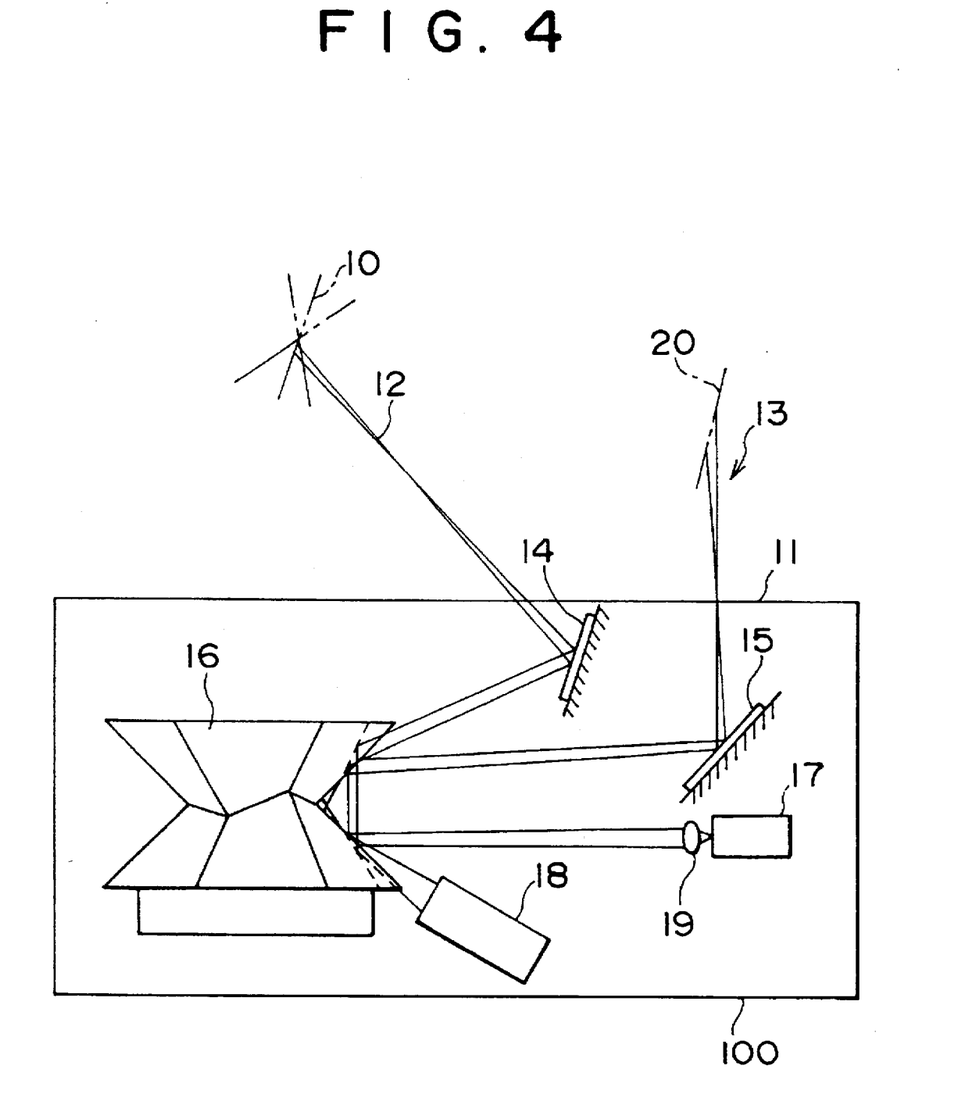
FIG. 4 is a diagram illustrating a principle of an embodiment of the present invention.

Referring to FIG. 4, a light source 17, a lens system 19, a scanning mechanism 16, a first mirror 14, a second mirror 15 and a photo detector 18 are provided in a housing 100 of a bar code reader. A light beam emitted from the light source 17 travels to the scanning mechanism 16 through the lens system 19. The light beam is divided into a first scanning beam 12 and a second scanning beam 13 by the scanning mechanism 16. The scanning mechanism 16 swings the first scanning beam 12 and the second scanning beam 13 in predetermined ranges, respectively. The first scanning beam 12 travels to the first mirror 14 and is reflected thereby. The first scanning beam 12 reflected by the first mirror 14 is emitted to the outside of the housing 100 through the transparent surface 11 of the housing 100. The first scanning beam 12 swung by the scanning mechanism 16 forms a first scanning pattern 10 in a first space over the transparent surface 11 of the housing 100. The second scanning beam 13 travels to the second mirror 15 and is reflected thereby. The second scanning beam 12 reflected by the second mirror 15 is emitted to the outside of the housing 100 through a transparent surface 11 of the housing 100. The second scanning beam 12 swung by the scanning mechanism 16 forms a second scanning pattern 20 in a second space over the transparent surface 11 of the housing 100.

The first scanning pattern 10 is formed, for example, so as to have many scanning lines extending in various directions. As a result, in a case where a bar code is scanned by the first scanning beam 12 having the first scanning pattern 10, it is acceptable for the bar code to be arranged in various directions in the first space. In addition, the focal point of the first scanning beam 12 is, for example, positioned over the transparent surface 11 of the housing 100 such that the readable depth in the first space is large.

The second scanning pattern 20 is formed, for example, so that each scanning line thereof is long. As a result, the bar code having a long sideways form can be precisely scanned by the second scanning beam 13. In addition, the focal point of the second scanning means 13 is positioned close to the transparent surface 11 of the housing 100. As a result, in a case where the bar code has a form in which the distances between bars are small, the bar code can be precisely read by the second scanning beam 13 due to the bar code being brought close to the transparent surface 11 of the housing 100.

A description will now be given of a first embodiment of the present invention.

Figure 5:
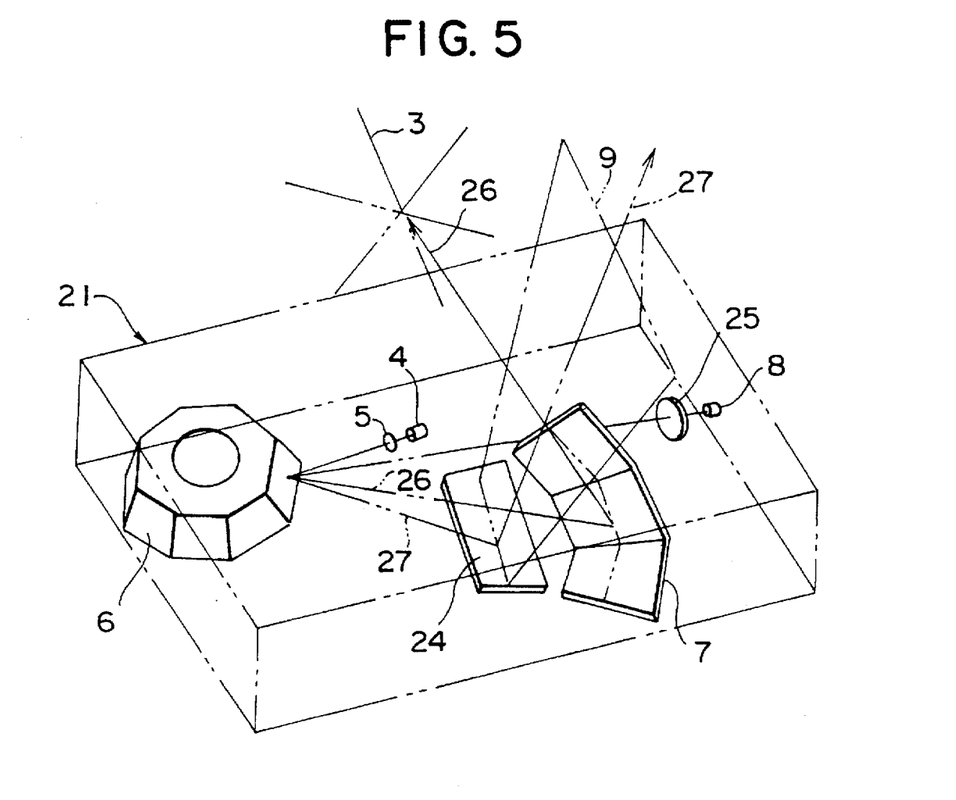
FIG. 5 is a diagram illustrating a bar code reader according to a first embodiment of the present invention.
Figure 6:
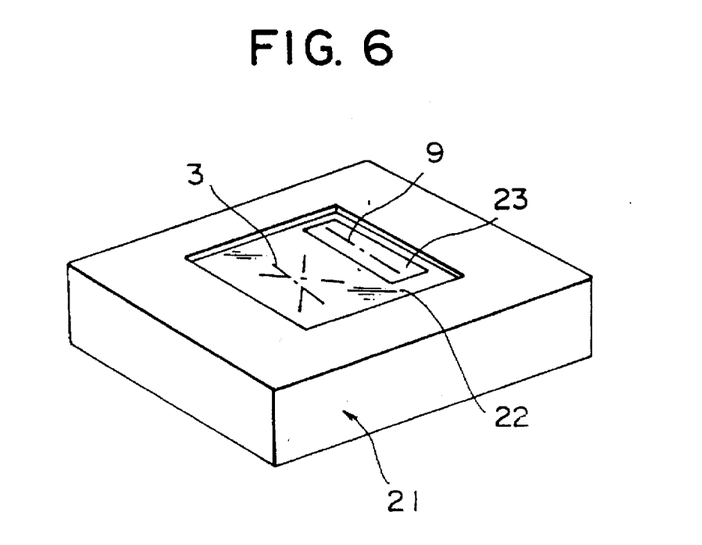
FIG. 6 is a diagram illustrating a housing of the bar code reader according to the first embodiment of the present invention.
Figure 7A:
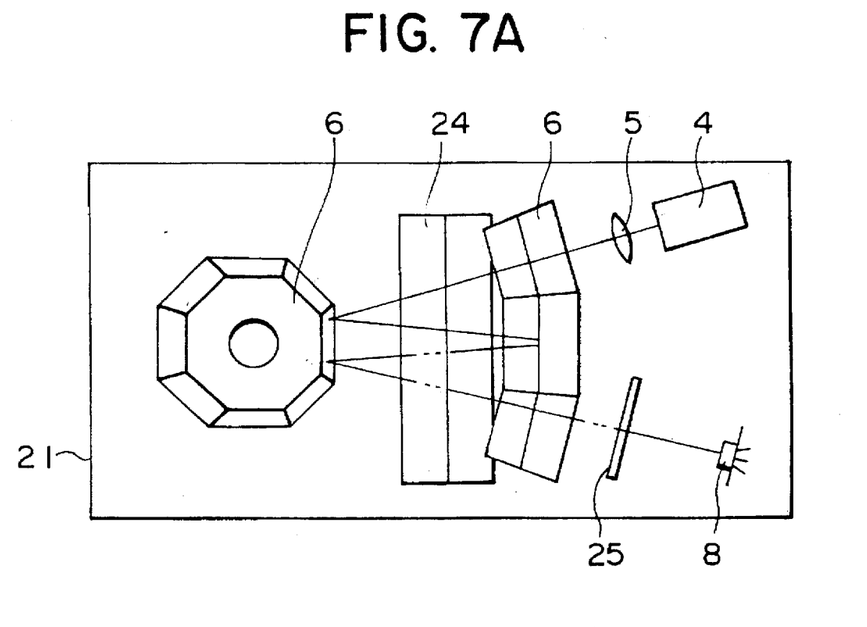
FIG. 7A is a plan view illustrating paths of laser beams in the bar code scanner shown in FIG. 5.
Figure 7B:
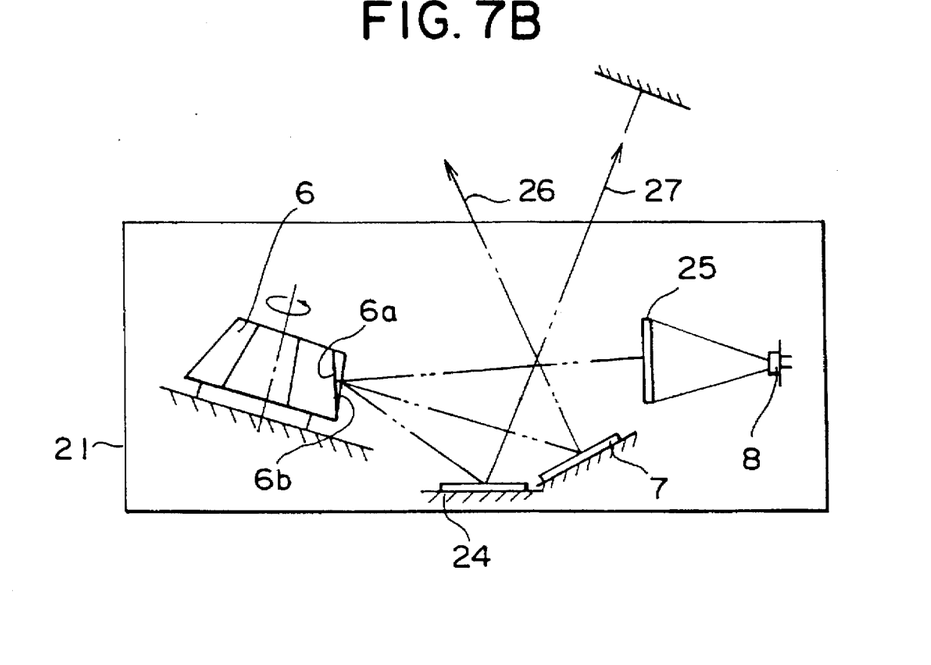
FIG. 7B is a side view illustrating paths of the laser beams in the bar code scanner shown in FIG. 5.

FIG. 5 shows a structure of the bar code reader according to the first embodiment of the present invention. Referring to FIG. 5, the laser diode 4, the beam forming lens 5, the polygonal mirror 6, the first reflecting mirror 7, a second reflecting mirror 24, a condenser lens 25 and a photo detector 8 are mounted in a housing 21 of the bar code scanner. The housing 21 has a top surface on which a window 22 is formed as shown in FIG. 6. A laser beam emitted by the laser diode 4 travels to the polygonal mirror 6 through the beam forming lens 5. The polygonal mirror 6 is rotated by a motor (not shown) at a constant speed and has first surfaces 6a and second surfaces 6b as shown in FIG. 7B. The first reflecting mirror 7 is positioned in the upward side of the second reflecting mirror 24 as shown in FIG. 7B. The first surfaces 6a of the polygonal mirror 6 are inclined such that the laser beam reflected by each of the first surfaces 6a travels to the first reflecting mirror 7. The second surfaces 6b of the polygonal mirror 6 are inclined such that the laser beam reflected by each of the second surfaces 6b travels to the second reflecting mirror 24. The surface of the first reflecting mirror 7 is divided into three segments. The inclination of the first reflecting mirror 7 and the inclination of the second reflecting mirror 24 are adjusted such that the laser beam reflected by the first reflecting mirror 7 and the laser beam reflected by the second reflecting mirror 24 do not interfere with each other.

The laser beam reflected by each of the first surfaces 6a of the polygonal mirror 6 is swung by the rotation of the polygonal mirror 6 and scans the three segments of the first reflecting mirror 7. The laser beam is reflected by the respective segments of the first reflecting mirror 7 in different directions. As a result, the laser beam reflected by the first reflecting mirror 7 is emitted through the window 22 and forms the first scanning pattern 3 having three scanning lines corresponding to the three segments of the first reflecting mirror 7. The laser beam reflected by the first reflecting mirror 7 is referred to as a multi-direction scanning beam 26. The multi-direction scanning beam 26 is used for scanning bar codes each of which has a normal form.

The laser beam reflected by each of the second surfaces 6b of the polygonal mirror 6 is swung by the rotation of the polygonal mirror 6 and scans the surface of the second reflecting mirror 24. The laser beam reflected by the second reflecting mirror 24 travels in a direction corresponding to the inclination of the second reflecting mirror 24 and is emitted through the window 22. As a result, the laser beam forms the second scanning pattern 9 having a single scanning line. A scanning line on the surface of the second reflecting mirror 24 is not divided into a plurality of segments. Thus, the scanning line of the second scanning pattern 9 is longer than each of the scanning lines of the first scanning pattern 3. The laser beam reflected by the second reflecting mirror 24 is used for scanning bar codes, each of which has a special form. This laser beam is referred to as a special scanning beam 27. An area, on the window 22, through which the special scanning beam 27 is emitted, is surrounded by a line as shown in FIG. 6. This area is referred to as a special code reading area 23. Due to special code reading area 23, an operator can easily recognize an area through which the special scanning beam 27 is emitted.

The length of an optical path in which the multi-direction scanning beam 26 travels, is adjusted such that the focal point (f) of the multi-direction scanning beam 26 is positioned over the window 22 as shown in FIG. 3A. The length of an optical path in which the special scanning beam 27 travels, is adjusted such that the focal point (f) of the special scanning beam 27 is positioned on or close to the surface of the window 22 as shown in FIG. 3B.

When the multi-direction scanning beam 26 scans a bar code on the surface of a commodity and is reflected by the surface, the reflected beam returns into the housing 21 through the window 22. The reflected beam then travels to the photodetector 8 via the first reflecting mirror 7, each of the first surfaces 6a of the polygonal mirror 6 and the condenser lens 25, as shown in FIGS. 7A and 7B. The special scanning beam 27 reflected by the surface of a commodity on which a bar code is formed returns into the housing 21 through the special code reading area 23 (shown in FIG. 6) and travels to the photodetector 8 via the second reflecting mirror 24, each of the second surfaces 6b of the polygonal mirror 6 and the condenser lens 25, as shown in FIG. 7B.

The operator brings a commodity into a space in which the first scanning pattern 3 is formed. A bar code formed on the surface of the commodity is scanned by the multi-direction scanning beam 26 forming the first scanning pattern 3. At least one of the scanning lines of the first scanning pattern 3 crosses all the bars of the bar code. At this time the photodetector 8 outputs a signal modulated in accordance with the pattern of the bar code. If the bar code has the long sideways form, each of the scanning lines of the first scanning pattern 3 can not cross all the bars of the bar code. Thus, a missreading occurs. In this case, the operator brings the commodity provided with the bar code having the long sideways form close to the special code read area 23 on the window 22. The special scanning beam 27 then scans the bar code such that the scanning line of the second scanning pattern crosses all the bars of the bar code. As a result, the bar code having the long sideways form can be precisely read.

If the bar code has a form in which the respective distances between bars are small, the beam spot of the multi-direction beam 26 projecting onto the surface having the bar code is larger than the distance between the bars of the bar code. Thus, the bar code, cannot be precisely read and a missreading occurs. In this case, the operator brings the bar code formed on the surface of the commodity to or in contact with the surface of the special code read area 23 of the window 22. As the focal point (f) of the special scanning beam 27 is positioned on or close to the surface of the window 22, the spot of the special scanning beam 27 projected onto the surface of the commodity on which the bar code is formed is very small. Thus, the bar code can be scanned by the very small spot. As a result, the bar code having the form in which respective distances between bars are small, can be optically read in a precise manner.

Figure 8:
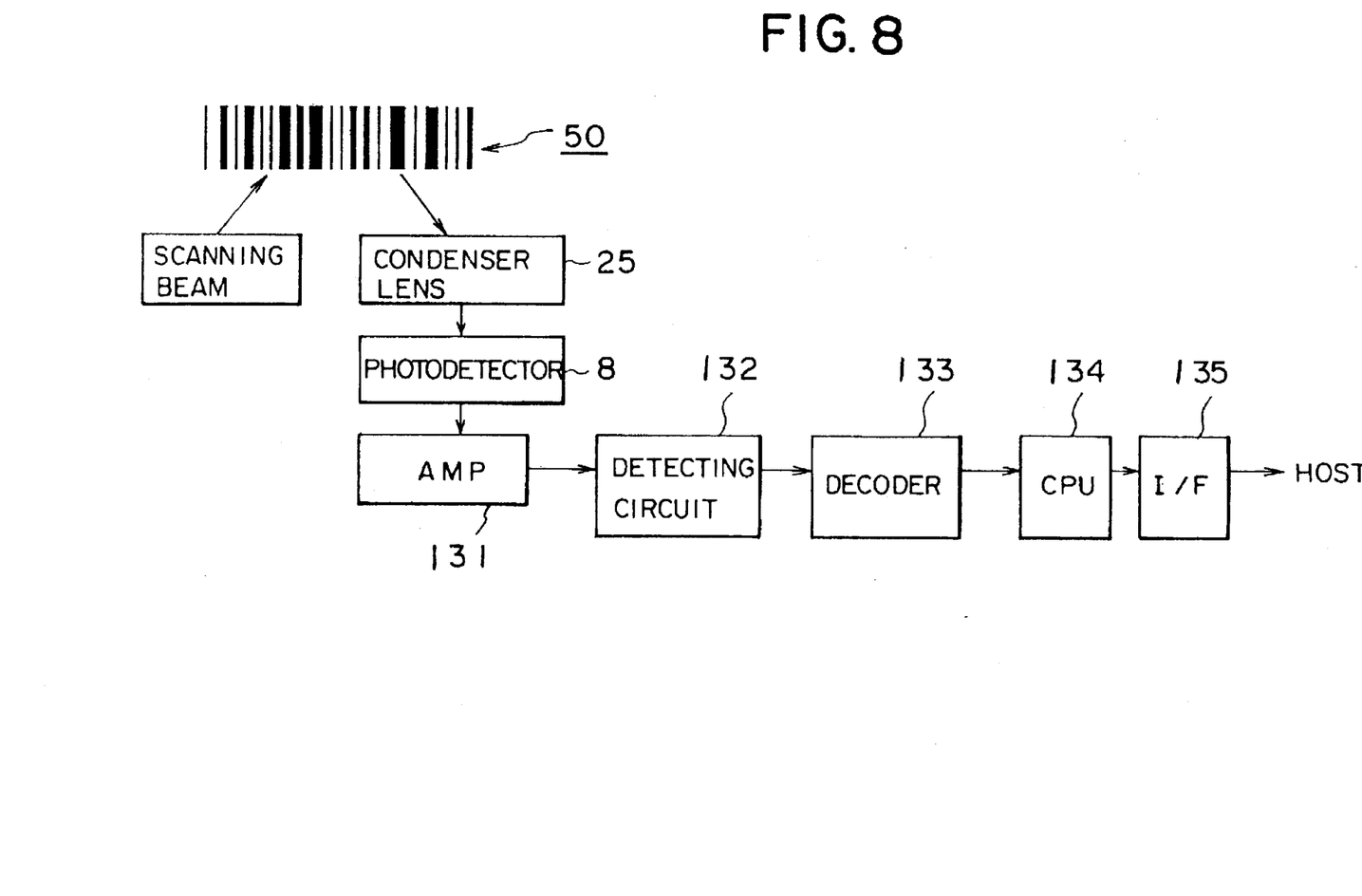
FIG. 8 is a block diagram illustrating a processing circuit of the bar code scanner.
Figure 9:
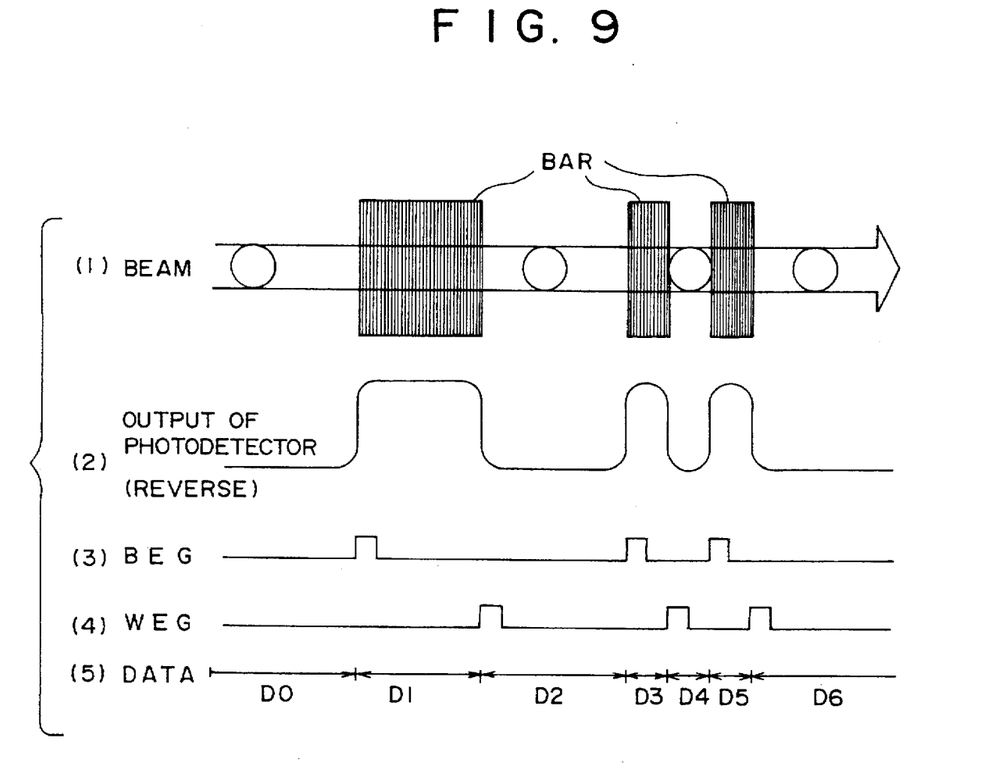
FIG. 9 is a wave form diagram illustrating wave forms of signals generated in the processing circuit shown in FIG. 8.

A processing circuit for processing signals output from the photodetector 8 is formed as shown in FIG. 8. Referring to FIG. 8, the processing circuit has an amplifier 131, a detecting circuit 132, a decoder 133, a CPU (Central Processing Unit) 134 and an interface unit 35. The photodetector 8 outputs a signal corresponding to a laser beam supplied through the condenser lens 25, as shown in FIG. 9 (2). The signal output from photodetector 8 is supplied to the detecting circuit 132 via the amplifier 131. The detecting circuit 132 converts the signal from the photodetector 8 into bi-level signals such as a BEG signal and a WEG signal, as shown in FIG. 9 (3) and (4). The bi-level signals (BEG and WEG) are supplied to the decoder 133. The decoder 133 generates decode data Do, D1, D2, D3, D4, D5, D6, . . . based on the bi-level signals (BEG and WEG), as shown in FIG. 9 (5). The decode data is supplied to the CPU 134. The CPU 134 generates code data corresponding to the bar code based on the decode data. The code data is then supplied to a host system via the interface unit 135.

A description will now be given, with reference to FIGS. 10, 11, 12A, 12B, 13, 14A, 14B, and 15, of a second embodiment of the present invention.

Figure 10:
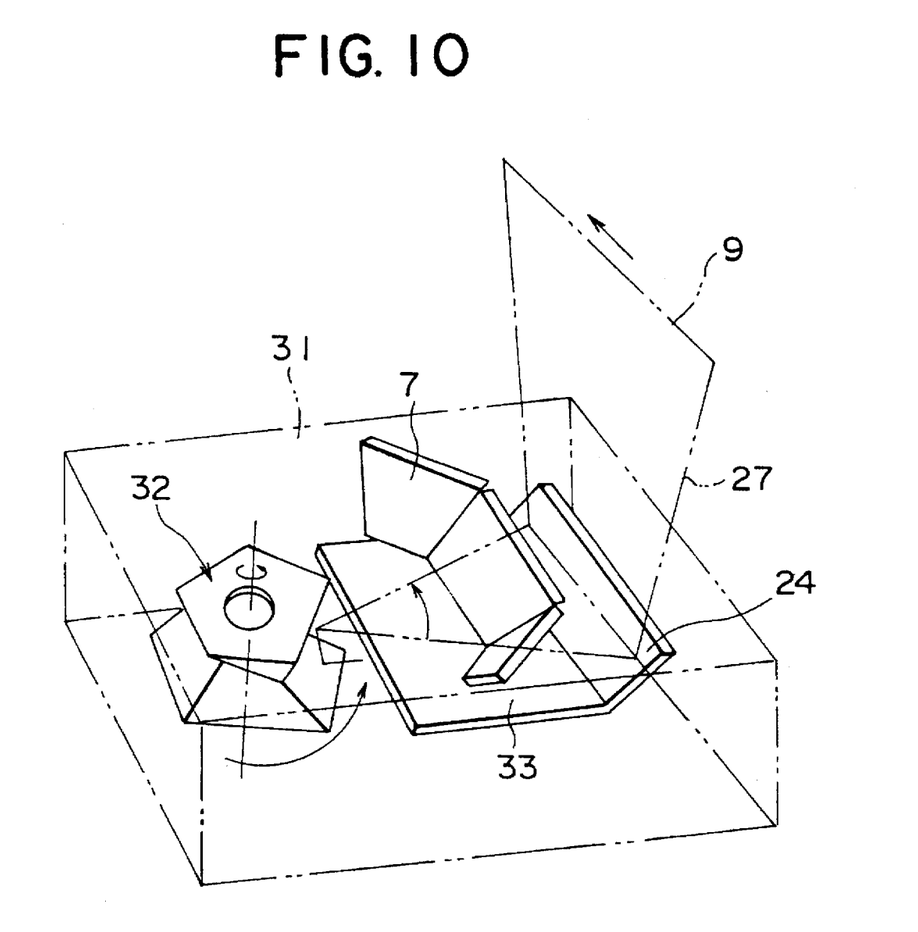
FIG. 10 is a diagram illustrating a bar code reader according to a second embodiment of the present invention.
Figure 11:
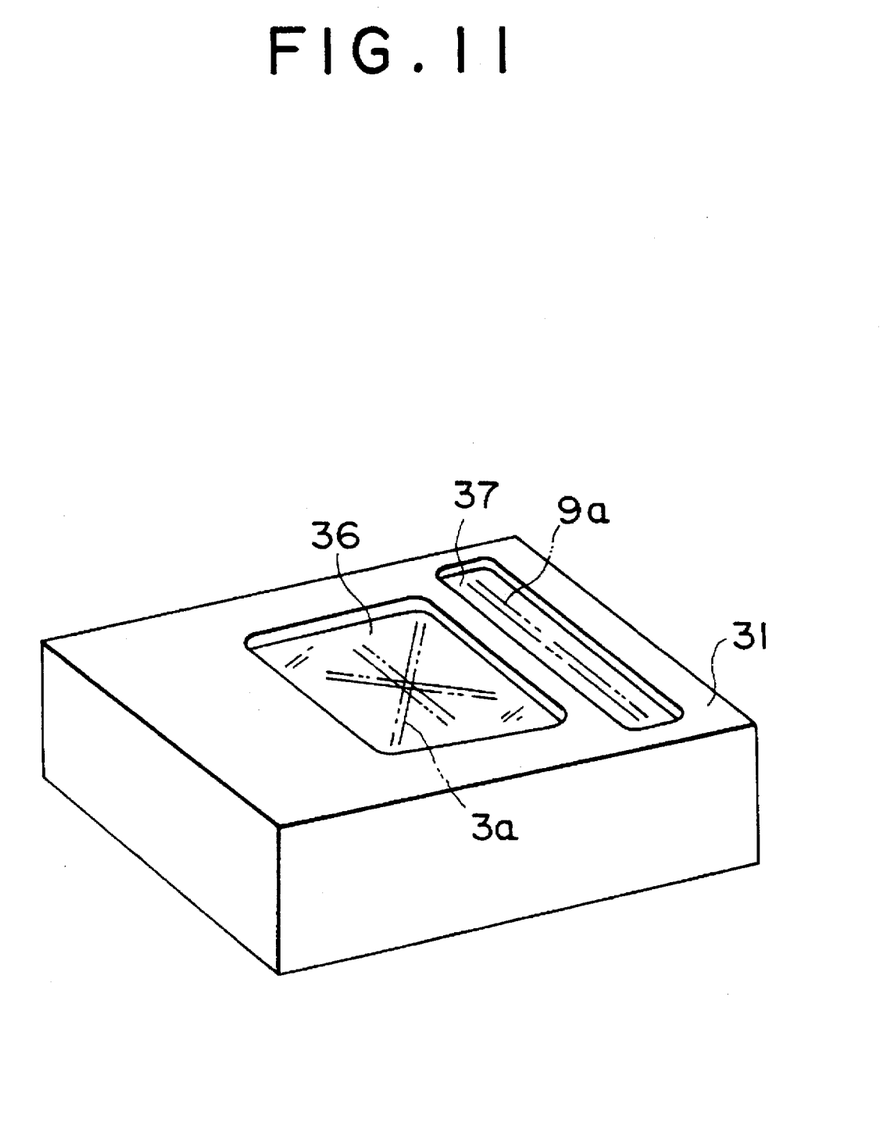
FIG. 11 is a diagram illustrating a housing of the bar code reader shown in FIG. 10.

Referring to FIGS. 10, 12A, 12B, 14A and 14B, the laser diode 4, the beam forming lens 5, the first reflecting mirror 7, the photodetector 8, the condense lens 25, a polygonal mirror 32, a shading plate 33, and mirrors 34 and 35 are provided in a housing 31 of the bar code scanner. As shown in FIG. 11, a first window 36 and a second window 37 are formed on a top surface of the housing 31. The polygonal mirror 36 is formed like a hand drum so as to have upper surfaces 32a facing obliquely downward and lower surfaces 32b facing obliquely upward. The upper surfaces 32a include first upper surfaces 32a1 and second upper surfaces 32a2, and the lower surfaces 32b include first lower surfaces 32b1 and second lower surfaces 32b2.

Figure 12A:
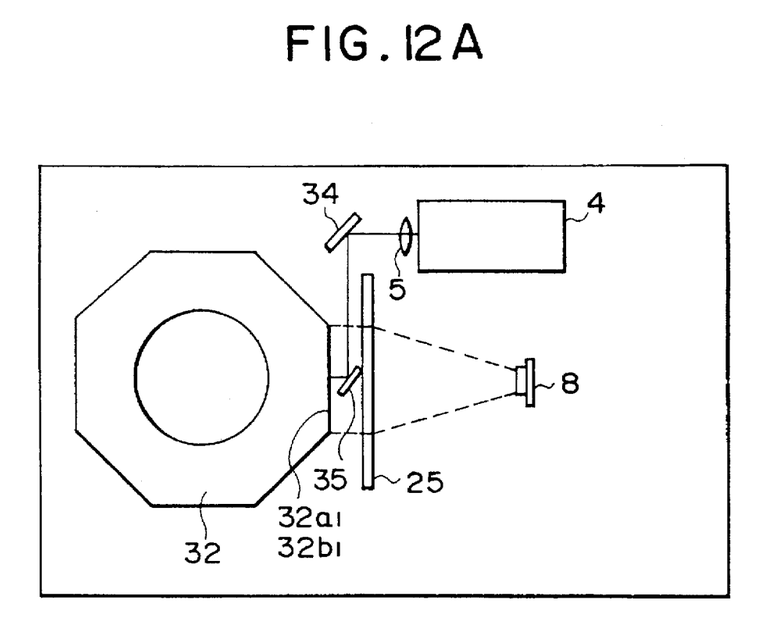
FIG. 12A is a plan view illustrating paths of a laser beam forming a first scanning pattern in the bar code scanner shown in FIG. 10.
Figure 12B:
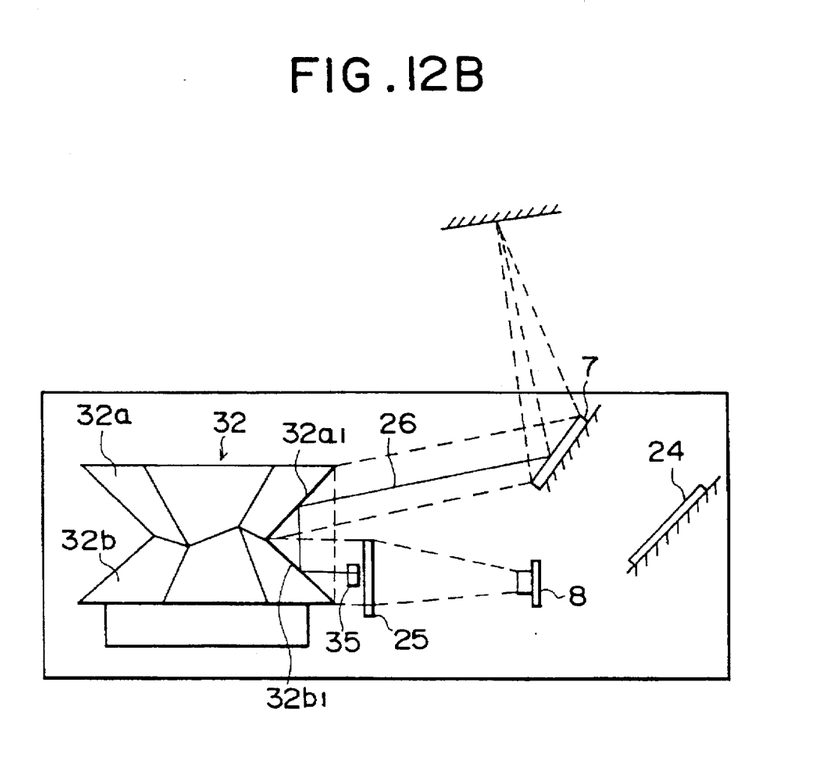
FIG. 12B is a side view illustrating paths of the laser beam forming the first scanning pattern in the bar code scanner shown in FIG. 10.
Figure 14A:
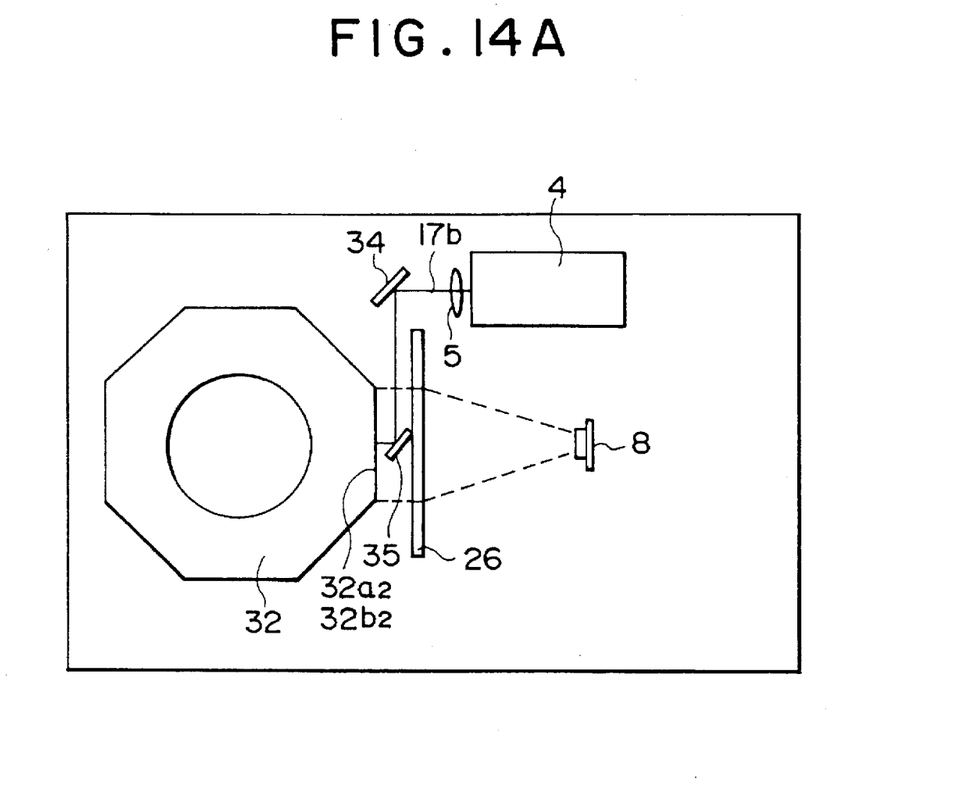
FIG. 14A is a plan view illustrating paths of a laser beam forming a second scanning pattern in the bar code scanner shown in FIG. 10.
Figure 14B:
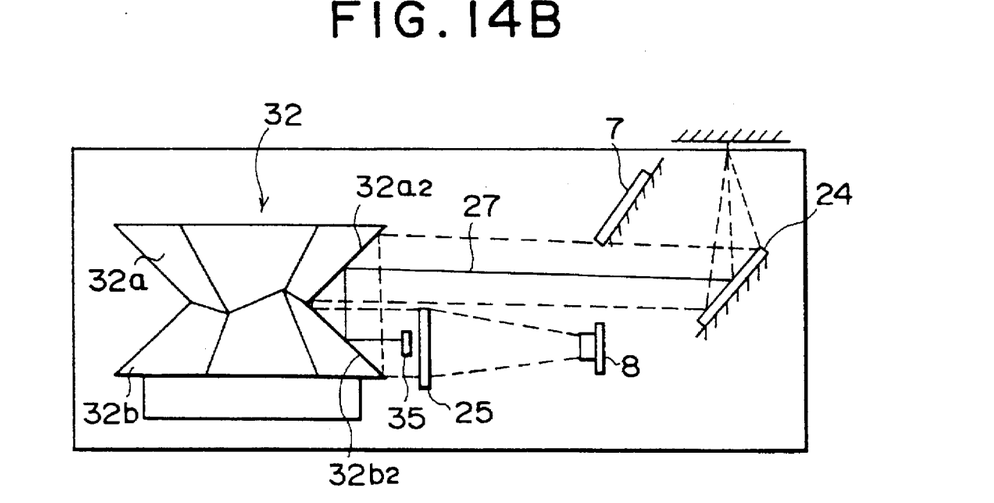
FIG. 14B is a side view illustrating paths of the laser beam forming the second scanning pattern in the bar code scanner shown in FIG. 10.

A laser beam emitted by the laser diode 4 travels to the polygonal mirror 32 via the beam forming lens 5 and the mirrors 34 and 35 as shown in FIG. 12A. The laser beam projected onto each of the first lower surfaces 32b1 of the polygonal mirror 32 is reflected thereby and travels to each of the corresponding first upper surfaces 32a1. The laser beam reflected by each of the first upper surfaces 32a1 of the polygonal mirror 32 travels to the first reflecting mirror 7 as shown in FIG. 12B. That is, the respective angles of the first upper surfaces 32a1 and those of the first lower surfaces 32b1 with respect to the axis of the polygonal mirror 32 are adjusted such that the laser beam reflected by them travels to the first reflecting mirror 7. The laser beam projected onto each of the second lower surfaces 32b2 is reflected thereby and travels to each of the corresponding second upper surfaces 32a2 as shown in FIG. 14B. The laser beam reflected by each of the second upper surfaces 32a2 travels to the second reflecting mirror 24. That is, the respective angles of the second upper surfaces 32a2 and each of the second lower surfaces 32b2 with respect to the axis of the polygonal mirror 32 are adjusted such that the laser beam reflected by them travels to the second reflecting mirror 24.

Figure 13:
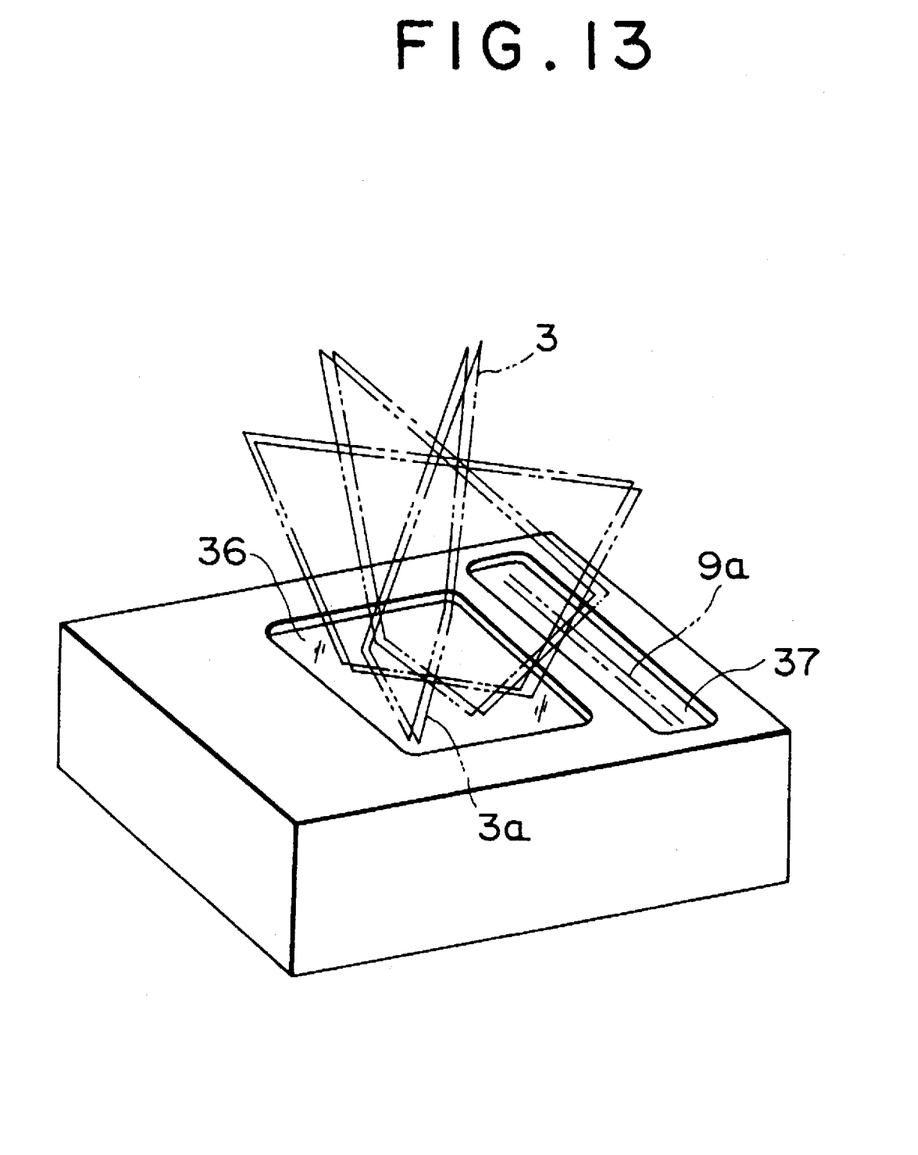
FIG. 13 is a diagram illustrating scanning patterns formed by the bar code scanner shown in FIG. 10.

The laser beam reflected by the first reflecting mirror 7 is emitted to the outside of the housing 31 through the first window 36. The surface of the first reflecting mirror 7 is divided into three segments so that three scanning lines are formed in the space over the first window 36. In addition, the angles of the respective first upper surfaces 32a1 with respect to the axis of the polygonal mirror 32 slightly differ from each other, and the angles of the first lower surfaces 32b1 with respect to the axis of the polygonal mirror 32 slightly differ from each other. Thus, while the polygonal mirror 32 is being rotated, the laser beam 26 reflected by the respective first upper surfaces 32a1 scans the first reflecting mirror 7 on different lines. As a result, the first scanning pattern 3a is formed as a set of a plurality of line patterns as shown in FIG. 13, each line pattern being formed of three scanning lines corresponding to the (three) segments of the surface of the first reflecting mirror 7. The number of patterns in the set is equal to the number of first upper surfaces 32a1 (first lower surfaces 32b1) of the polygonal mirror 32.

Figure 15:
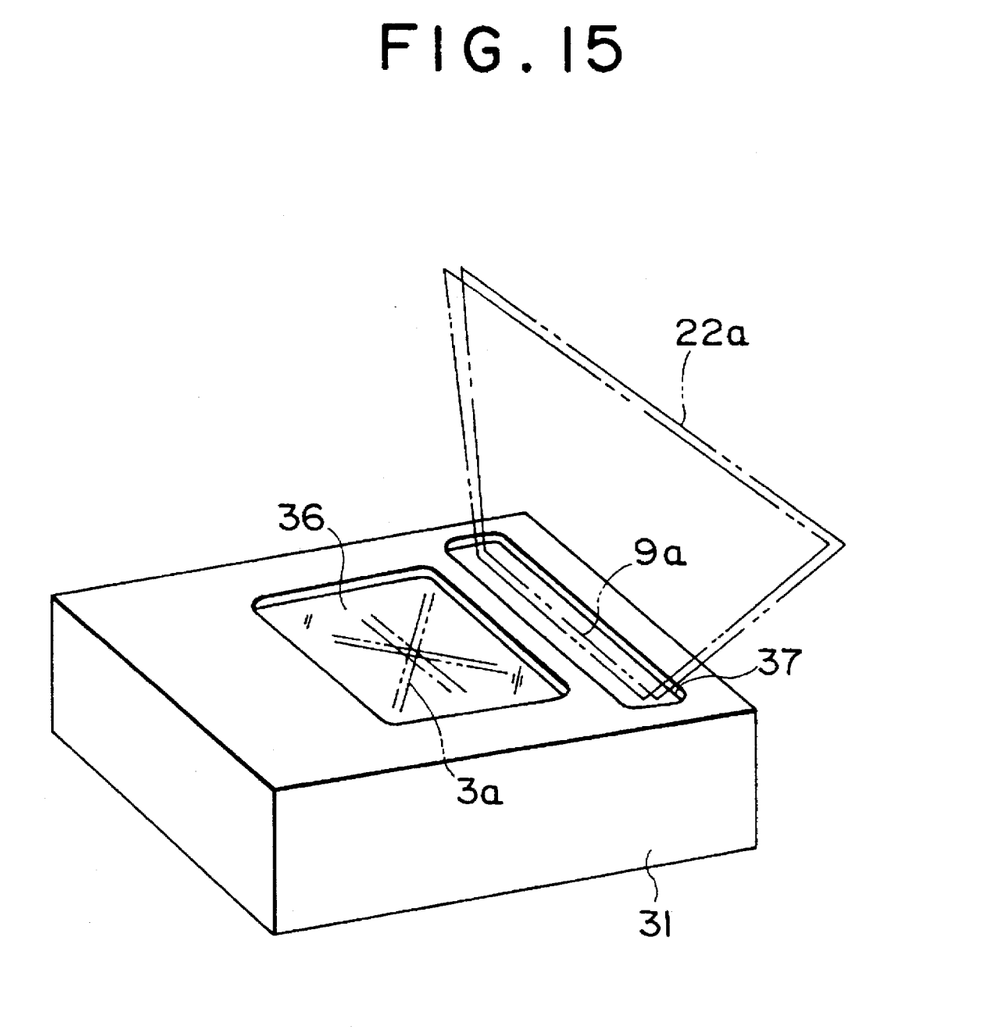
FIG. 15 is a diagram illustrating scanning patterns formed by the bar code scanner shown in FIG. 10.

The laser beam reflected by the second reflecting mirror 24 is emitted to the outside of the housing 31 through the second window 37 as shown in FIG. 15. Angles of the respective second upper surfaces 32a2 with respect to the axis of the polygonal mirror 32 differ slightly from each other, and angles of the second lower surfaces 32b2 with respect to the axis of the polygonal mirror 32 differ slightly from each other. Thus, while the polygonal mirror 32 is being rotated, the laser beam 27 reflected by the respective second upper surfaces 32a2 scans the second reflecting mirror 24 on different lines. As a result, the second scanning pattern 9a is formed as a set of a plurality of line patterns as shown in FIG. 15, each line pattern being formed of a single scanning line corresponding to the surface of the first reflecting mirror 7. The number of patterns in the set is equal to the number of second upper surfaces 32a2 (second lower surfaces 32b2) of the polygonal mirror 32. Each of the scanning lines forming each second scanning pattern 9a is longer than each of the scanning lines forming each first scanning pattern 3a.

The length of the optical path from the laser diode 4 to the first reflecting mirror 7 is adjusted such that the focal point of the laser beam forming the first scanning pattern 9a is positioned at in the space over the first window 36. The length of the optical path from the laser diode 4 to the second reflecting mirror 24 is adjusted such that the focal point of the laser beam forming the second scanning pattern 9a is positioned on or close to the surface of the second window 37.

The laser beam reflected by the surface of a commodity brought into the space over the first window 36 returns into the housing through the first window 36, and then travels to the photodetector 8 via the first reflecting mirror 7, each of the first upper surfaces 32a1 of the polygonal mirror 32, each of the first lower surface 32b1 of the polygonal mirror 32 and the condense lens 25, as shown in FIGS. 12A and 12b. In addition, the laser beam reflected by the surface of the commodity brought into the space over the second window 37 returns into the housing through the second window 37, and travels to the photodetector 8 via the second reflecting mirror 24, each of the second upper surfaces 32a2 of the polygonal mirror 32, each of the second lower surfaces 32b2 and the condenser lens 25, as shown in FIGS. 14A and 14B.

In the bar code reader according to the second embodiment, the operator generally brings a commodity into the space over the first window 36 so that a bar code formed on the commodity is scanned by the first scanning pattern 9a. On the other hand, if a bar code has a special form, such as a long sideways form and a form in which respective distances between bars are small, and thus a missreading occurs, a commodity on which the bar code having the special form is attached is brought close to or in contact with the surface of the second window 37.

According to the second embodiment, even if a bar code to be scanned has a special form, the bar code can be scanned precisely by use of the second scanning pattern 9a in the same manner as in the first embodiment.

In the above first and second embodiments, the surfaces of the second reflecting mirror 24 may be divided into segments. However, the number of segments of the second reflecting mirror 24 must be less than the number of segments of the first reflecting mirror so that each of the scanning lines of the second scanning pattern 9 (9a) is longer than each of the scanning line of the first scanning pattern 3 (3a).

The present invention is not limited to the aforementioned embodiments, and variations and modifications may be made without departing from the scope of the claimed invention.

What is claimed is:

1. An optical scanner for optically scanning a bar code, said optical scanner comprising:

a housing;

a first scanning system, housed in said housing, for emitting a first scanning beam which passes through a first area on said housing, the first scanning beam being focused at a first focal position at a distance from the first area and moving in a first scanning pattern, the first scanning beam suitable for optically scanning a first type of bar code; and a second scanning system, housed in said housing, for emitting a second scanning beam which passes through a second area on said housing, the second area being different from the first area, the second scanning beam being focused at a second focal position at a distance from the second area and moving in a second scanning pattern, the distance from the first focal position to the first area being different than the distance from the second focal position to the second area, the second scanning beam suitable for optically scanning a second type of bar code which is different from the first type of bar code.

2. The optical scanner as claimed in claim 1, wherein the first scanning beam and the second scanning beam travel in different directions.

3. The optical scanner as claimed in claim 1, wherein the first scanning beam and the second scanning beam do not interfere with each other.

4. The optical scanner as claimed in claim 1, wherein the first area and the second area are on a window formed on said housing, the second area being distinguished from the first area.

5. The optical scanner as claimed in claim 4, wherein the second area is distinguished from the first area by a mark.

6. The optical scanner as claimed in claim 5, wherein the mark is a line surrounding the second area.

7. The optical scanner as claimed in claim 1, wherein the first area is on a first window formed on said housing and the second area is on a second window formed on said housing.

8. The optical scanner as claimed in claim 1, wherein a scanning line included in the second scanning pattern is longer than a scanning line included in the first scanning pattern.

9. The optical scanner as claimed in claim 1, wherein a number of scanning lines included in the first scanning pattern is greater than a number of scanning lines included in the second scanning pattern.

10. The optical scanner as claimed in claim 1, wherein a distance between the second focal position and a surface of the second area is smaller than a distance between the first focal position and a surface of the first area.

11. The optical scanner as claimed in claim 10, wherein the second focal position is on the surface of the second area and the first focal position is in a space over the first area.

12. The optical scanner as claimed in claim 1, wherein a spot size of the second scanning beam at a position on the second area is smaller than a spot size of the first scanning beam at a position on the first area.

13. An optical scanner for optically scanning a bar code, said optical scanner comprising:

a housing having a window formed on a predetermined surface thereof;

a light source, housed in said housing, for emitting a light beam;

an optical mechanism, housed in said housing, for splitting the light beam into a first scanning beam and a second scanning beam;

a first optical system, housed in said housing, for emitting the first scanning beam from said housing through said window and for focusing the first scanning beam at a first focal position, the first scanning beam being moved in a first scanning pattern;

a second optical system, housed in said housing, for emitting the second scanning beam from said housing through said window and for focusing the second scanning beam at a second focal position, the second scanning being moved in a second pattern, and a distance between the second focal position and a surface of said window being smaller than a distance between the first focal position and the surface of said window.

14. The optical scanner as claimed in claim 13, wherein the second focal position is on the surface of said window.

15. The optical scanner as claimed in claim 13, wherein said optical mechanism has a polygonal mirror rotated at a predetermined speed, said polygonal mirror having first surfaces and second surfaces, angles of each of the first surfaces with respect to the light beam being different from angles of each of the second surfaces with respect to the light beam, so that the first scanning beam is obtained by reflecting the light beam on the first surfaces and the second scanning beam is obtained by reflecting the light beam on the second surfaces.

16. The optical scanner as claimed in claim 13, wherein said window is segmented into a first area through which the first scanning beam passes and a second area through which the second scanning beam passes.

17. The optical scanner as claimed in claim 16, wherein the first area is distinguished from the second area.

18. The optical system as claimed in claim 17, wherein the first area is distinguished from the second area by a mark.

19. The optical scanner as claimed in claim 13, wherein said window is segmented into a first sub-window through which the first scanning beam passes and a second sub-window through which the second scanning beam passes.

20. The optical scanner as claimed in claim 13, wherein a scanning line included in the second scanning pattern is longer than a scanning line included in the first scanning pattern.

21. The optical scanner as claimed in claim 13, wherein said first optical system has a first mirror for reflecting the first scanning beam and said second optical system has a second mirror for reflecting the second scanning, a number of surface segments of said first mirror being greater than a number of surface segments of said second mirror.

22. The optical scanner as claimed in claim 21, wherein the second mirror has a single surface segment.

23. An optical scanner for optically scanning a bar code, said optical scanner comprising:

a housing;

a first scanning system, housed in said housing, for emitting a first scanning beam from a predetermined surface of said housing, the first scanning beam moving in a first scanning pattern;

a second scanning system, housed in said housing, for emitting a second scanning beam from the predetermined surface of said housing, the second scanning beam moving in a second scanning pattern, a scanning line included in the second scanning pattern is longer than a scanning line included in the first scanning pattern.

24. The optical scanner as claimed in claim 23, wherein a number of scanning lines included in the first scanning pattern is greater than a number of scanning lines included in the second scanning pattern.

25. The optical scanner as claimed in claim 23, wherein said housing has a window segmented into a first area through which the first scanning beam passes and a second area through which the second scanning beam passes.

26. The optical scanner as claimed in claim 25, wherein a distance between a first focal position of the first scanning beam and a surface of said window is greater than a distance between a second focal position of the second scanning beam and the surface of said window.

27. The optical scanner as claimed in claim 26, wherein the second focal position of the second scanning beam is on the surface of the window.

28. The optical scanner as claimed in claim 23, wherein said housing has a first window through which the first scanning beam passes and a second window through which the second scanning beam passes.

29. The optical scanner as claimed in claim 28, wherein a distance between a first focal position of the first scanning beam and a surface of said first window is greater than a distance between a second focal position of the second scanning beam and a surface of said second window.

30. The optical scanner as claimed in claim 29, wherein the second focal position of the second beam is on the surface of said second window.

31. The optical scanner as claimed in claim 23, wherein said first scanning system has a first mirror by which a light beam is reflected so that the first scanning beam is generated and said second scanning system has a second mirror by which the light beam is reflected so that the second scanning beam is generated, said first mirror having a number of surfaces greater than a number of surfaces of said second mirror.

32. The optical scanner as claimed in claim 31, wherein the second mirror has a single surface.

33. The optical scanner as claimed in claim 23, wherein a spot size of the second scanning beam on the predetermined surface of said housing is smaller than a spot size of the first scanning beam on the predetermined surface of said housing.

34. An optical scanner for optically scanning a bar code, comprising:
- a housing which includes a window, the window having first and second surface areas thereon and which are different from each other;
- a first scanning system, housed in the housing, for emitting a scanning beam which passes through the first surface area on the window and forms a cross-line pattern; and
- a second scanning system, housed in the housing, for emitting a scanning beam which passes through the second surface area on the window and forms a line pattern on the second surface area.

35. An optical scanner as claimed in claim 34, wherein the line pattern formed by the scanning beam emitted by the second scanning system extends in a direction, and the second surface area on the housing extends in the same direction as the line pattern and in accordance with the length of the line pattern.

36. An optical scanner for optically scanning a bar code, said optical scanner comprising:
- a housing;
- a first scanning system, housed in said housing, for emitting a first scanning beam which passes through a first area on said housing, the first scanning beam being focused at a first focal position and moving in a first scanning pattern; and
- a second scanning system, housed in said housing, for emitting a second scanning beam which passes through a second area on said housing, the second area being different from the first area, the second scanning beam being focused at a second focal position different from the first focal position and moving in a second scanning pattern, wherein a scanning line included in the second scanning pattern is longer than a scanning line included in the first scanning pattern.

37. An optical scanner for optically scanning a bar code, said optical scanner comprising:
- a housing;
- a first scanning system, housed in said housing, for emitting a first scanning beam which passes through a first area on said housing, the first scanning beam being focused at a first focal position and moving in a first scanning pattern; and
- a second scanning system, housed in said housing, for emitting a second scanning beam which passes through a second area on said housing, the second area being different from the first area, the second scanning beam being focused at a second focal position different from the first focal position and moving in a second scanning pattern, wherein a number of scanning lines included in the first scanning pattern is greater than a number of scanning lines included in the second scanning pattern.

38. An optical scanner for optically scanning a bar code, said optical scanner comprising:
- a housing;
- a first scanning system, housed in said housing, for emitting a first scanning beam which passes through a first area on said housing, the first scanning beam being focused at a first focal position and moving in a first scanning pattern; and
- a second scanning system, housed in said housing, for emitting a second scanning beam which passes through a second area on said housing, the second area being different from the first area, the second scanning beam being focused at a second focal position different from the first focal position and moving in a second scanning pattern, wherein a distance between the second focal position and a surface of the second area is smaller than a distance between the first focal position and a surface of the first area.

39. The optical scanner as claimed in claim 38, wherein the second focal position is on the surface of the second area and the first focal position is in a space over the first area.

40. An optical scanner for optically scanning a bar code, said optical scanner comprising:
- a housing;
- a first scanning system, housed in said housing, for emitting a first scanning beam which passes through a first area on said housing, the first scanning beam being focused at a first focal position and moving in a first scanning pattern; and
- a second scanning system, housed in said housing, for emitting a second scanning beam which passes through a second area on said housing, the second area being different from the first area, the second scanning beam being focused at a second focal position different from the first focal position and moving in a second scanning pattern, wherein a spot size of the second scanning beam at a position on the second area is smaller than a spot size of the first scanning beam at a position on the first area.

* * * * *